INVENTOR:
Hermann Joseph PENNTHER

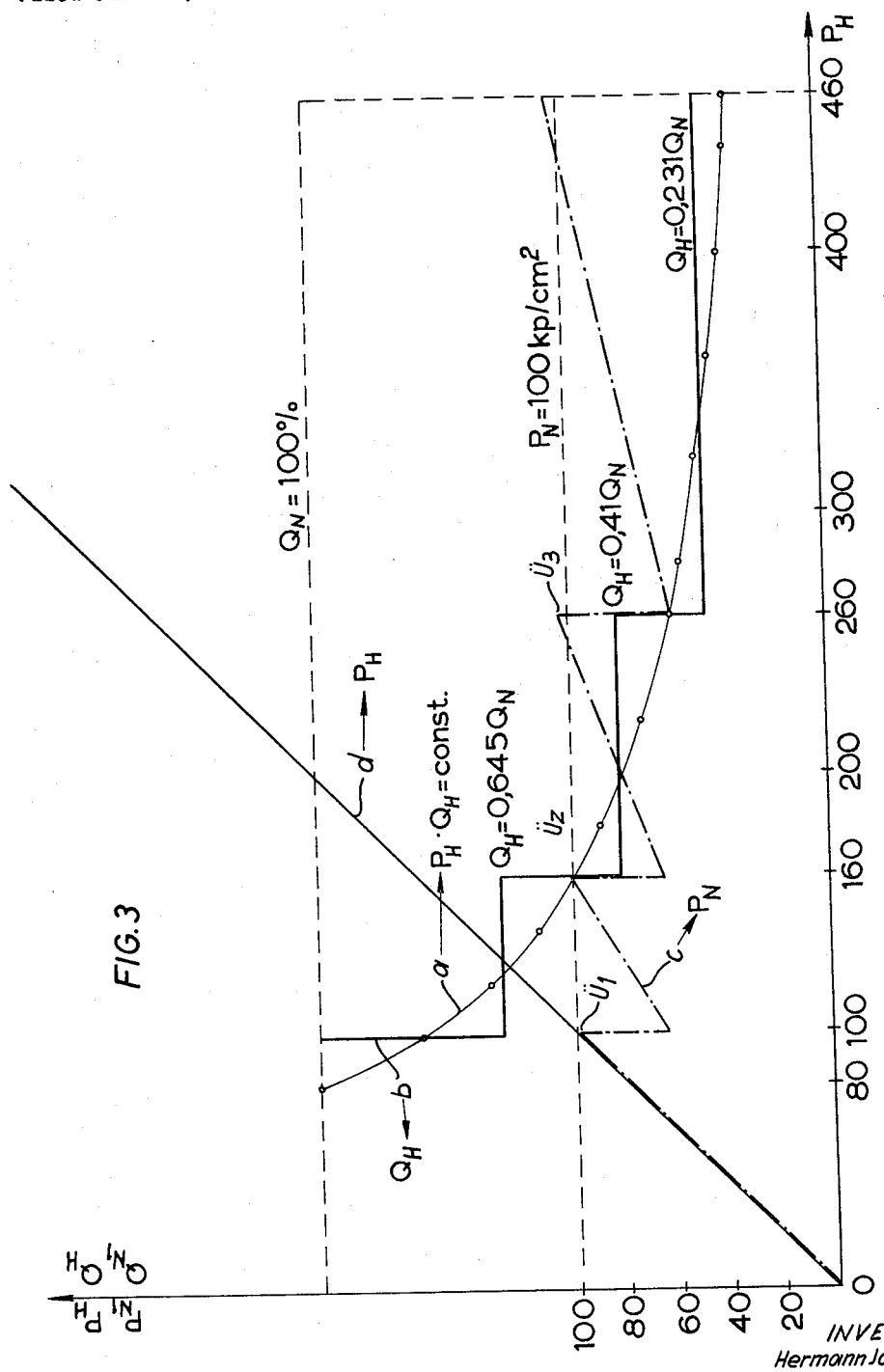

United States Patent Office 3,440,967
Patented Apr. 29, 1969

3,440,967
FLUID PRESSURE SOURCE WITH BOOSTER
Hermann Joseph Pennther, Saarbrucken, Germany, assignor to Stahl- und Apparatebau Hans Leffer G.m.b.H., Dudweiler-Saar, Germany
Filed Jan. 10, 1967, Ser. No. 608,302
Claims priority, application Germany, Jan. 13, 1966, St 24,866
Int. Cl. F04b 1/12, 5/00, 19/02
U.S. Cl. 103—51                                                6 Claims

ABSTRACT OF THE DISCLOSURE

A double acting hydraulic pressure booster incorporates on each high pressure side at least two manually separate parallel acting pressure chambers having different piston areas which can be brought into operation together and individually by controlled back pressure valves. The back pressure valves are selectively operated on increasing pressure on the high pressure side and the associated pressure chambers are released from pressure in turn so that the feed amount delivered into the high pressure circuit by a feed pump with constant delivery progressively falls so as to maintain constant the product of the pressure and the delivery volume so as to maintain full output from the motor driving the feed pump.

---

The invention relates to a fluid pressure source including a pressure booster device with a hydraulic or pneumatic feed pump for producing the low pressure and a double-acting pressure booster connected to it, as is used for example for driving hydraulic presses. Here as also in other similar cases, at the beginning of the working stroke of the press or in general when starting the pressure producing equipment, initially large amounts of oil at low pressure are required but later small amounts of oil at high pressures.

The invention is based on recognition of the fact that for such requirements the time required for completing a working stroke or for building up a pressure is a minimum for a given driving rate of the feed pump if the working operation follows an equal load curve, that is to say, the product of pressure and volume is constant over the whole operation so that the driving motor operates constantly at full load.

In order to attain this object it is possible to use a pump with a pressure dependent delivery rate. Thereby within a limited pressure range the upper limit of which is determined by the permissible maximum pressure of the pump, it is possible to obtain a coarse approximation to the ideal curve. Since however with such pumps the upper pressure limit cannot be made sufficiently high owing to leakage losses and wear, it is necessary to use a following pressure booster for covering the pressure range extending beyond this limit. Such pressure producing devices, on which the invention is based, are however disadvantageous insofar as the working efficiency is low in the range of small amounts of oil—apart from the increased costs of a feed pump with a variable delivery rate (regulating pumps).

The invention is directed to the problem of providing a hydraulic pressure producing plant with a feed pump and double acting pressure booster which is suitable for the requirement of using as fully as possible over the working cycle the installed driving output of the pump motor for an operated member which requires large amounts of oil at low pressures at the beginning of a working cycle and finally small amounts of oil at high pressures or—conversely—may be at the minimum for a given driving load over the period required for one cycle without it being necessary to take into account the disadvantages of a regulating pump as regards the working efficiency and the high costs.

The solution of this problem consists according to the invention in the fact that the pressure producing device consists of a feed pump with a constant delivery and a pressure booster which has at least two separate parallel acting pressure chambers with different piston areas at each high pressure side which can be brought into operation together and independently in the manner to give a stepwise lowering of the high pressure feed amount for increasing the high pressure. The essential feature of the invention is thus the combination of a simple pump of constant delivery rate with a double acting pressure booster the ratio of which is increased stepwise during one working cycle dependently on the high pressure in order that the product of the pressure and volume on the high pressure side is held within the limits given by the loading of the pump motor.

The selection of the various ratios of the pressure booster as well as the changeover points from one ratio to the other are determined according to the particular properties of the consuming member. The changeover of the ratios or the pressure steps dependently on the high pressure can also be effected dependently on the movement, with one working piston as the consuming member, or programmed otherwise.

The construction of the multi-stage pressure booster is simplified within the framework of the invention in general by the fact that for example with two different pairs of pressure chambers three different ratios are obtained if in the first step the pressure chambers are connected in parallel side-by-side, in the second stage the pair of pressure chambers with the smallest piston surfaces are first cut off and are connected again in the third stage on cutting off the pair of pressure chambers with the larger piston surfaces.

Within the framework of the invention the various ratios of the pressure booster can be provided by stepwise offset high pressure pistons but there is obtained an advantageous short constructional length if with a construction with two different pairs of pressure chambers the smaller pressure chambers are formed by a blind bore in the high pressure pistons and fixed pistons projecting thereinto, which pistons are provided with a longitudinal duct for connection to the high pressure circuit and the other larger pressure chambers are formed by the remaining ring surfaces of the high pressure pistons and the high pressure cylinders.

For cutting off the pressure chambers for control directly by the pressure or for changing over the ratios a simpler way consists in the fact that the suction valves of the pressure chambers are controlled back pressure valves which are held open for cutting off the pressure chambers. A control for this purpose using pre-stressed pilot valves is further explained in the following description of a pressure producing device according to the invention with a three-stage pressure booster, and with reference to the accompanying drawings wherein:

FIG. 3 is a graph.

Figure 1:
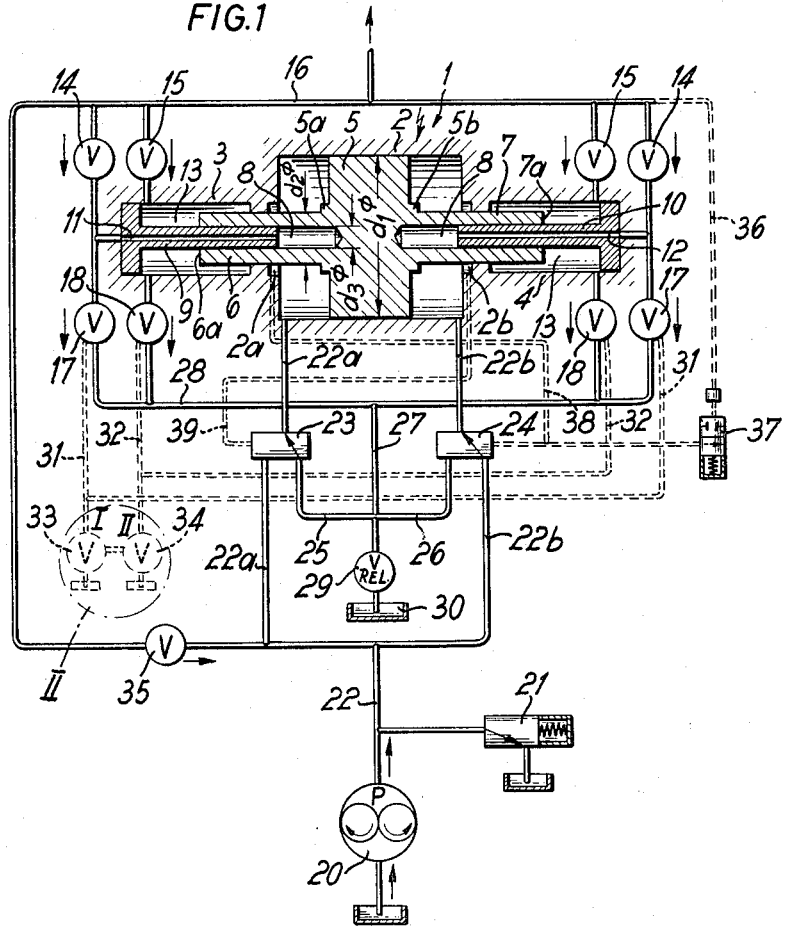
FIG. 1 shows a diagrammatic view of the pressure booster with a hydraulic circuit.

The double acting pressure booster 1 shown consists of a low pressure cylinder 2, two high pressure cylinders 3, 4, a low pressure piston 5 operable on two sides of diameter $d_1$ and two high pressure pistons 6, 7 of diameter $d_2$. The pistons 6, 7 are provided with blind bores 8 of diameter $d_3$ which form a pair of pressure chambers 8 of minimum cross section for providing in each case two pressure chambers on the high pressure side having different piston areas. Stationary pistons 9, 10 project into these blind bores or pressure chambers 8 which rest against covers of the high pressure cylinders 3, 4 or are unitary with them and which have in each case a longitudinal duct 11, 12 for connection to the high pressure circuit. By this construction, to which the invention is not however limited, there is obtained with a desirable short constructional length of the pressure booster 1, two different pairs of pressure chambers on the high pressure sides, namely the pressure chambers 8 already referred to having the small diameter corresponding to $d_3$, as well as the pressure chambers 13 having the cross section of the remaining ring surfaces 6a, 7a.

Since the pair of pressure chambers 8 and 13—as still to be described—can be brought into action together according to the invention and also individually there is obtained the three following pressure stages or boost ratios.

With the pressure chambers connected in parallel side-by-side:

$$\ddot{U}_1 = \frac{d_1^2 - d_2^2}{d_2^2}$$

With the pair of pressure chambers 8 cut off; and $$\ddot{U}_2 = \frac{d_1^2 - d_2^2}{d_2^2 - d_3^2}$$

With the pair of pressure chambers 13 cut off and the pair of pressure chambers 8 brought into action.

$$\ddot{U}_3 = \frac{d_1^2 - d_2^2}{d_3^2}$$

$\ddot{U}_2$ is greater than $\ddot{U}_1$ and $\ddot{U}_3$ is again greater than $\ddot{U}_2$ The pressure chambers 8 and 13 are connected through pairs of pressure valves 14, 15 to the high pressure pipe 16 and draw in through pairs of suction valves 17, 18.

A low pressure pump 20, which according to the invention may be the simple type of pump with a constant delivery rate, feeds through a pipe 22 controlled by the pressure regulator 21 which branches into the pipes 22a and 22b, and through three-way reciprocation pilot control valves 23, 24 into the pressure chambers of the low pressure cylinder 2. The oil flowing back from the low pressure cylinder 2 is fed through the other three-way pilot valves 23, 24 in each case and through the pipes 25, 26, 27 into the common feed pipe 28 for the high pressure suction valves 17, 18.

The suction chambers are rapidly and adequately filled because the oil which would otherwise flow away without pressure from the respective other side of the low pressure piston 5 is preset to a low pressure by a relief valve 29 which allows surplus amounts of oil to pass to the container 30. The resulting reduction in the working efficiency is of small importance. With a preset pressure of 4 kg./cc. it lies between 1.5 and 3% according to the booster ratio.

The control of the pressure booster 1 for the various pressure steps or booster ratios whereby when using a pressure pump 20 having a constant delivery the product of pressure and delivery on the high pressure side is to be held substantially constant, is effected in the constructional example directly dependently on the high pressure in the pipe 16. For this purpose the suction valves 17, 18 are constructed as controlled back pressure valves which can be held open for selectively cutting off individual pairs of pressure chambers.

Since the pistons of the pressure booster reciprocate in rapid sequence, it is sufficient if in each case the inspiring, i.e. open, suction valve of one high pressure side is first opened at the reversal point in order that none of the suction valves needs to be controlled against the high pressure. The control pressure can then be the preset pressure produced by the relief valve 29 which is fed via branch pipes, not further described, into the control chambers of the controlled back pressure valves 17, 18.

The control pipes 31, 32 running from the suction valves 17, 18 are united in pairs to form control pipes I and II which lead respectively to pilot valves 33, 34 held open for the return movement by an adjustable counter pressure for example spring pressure. In place of the spring pressure it is also possible to use a constant hydraulic pressure by which the reversal is effected more rapidly.

Figure 2:
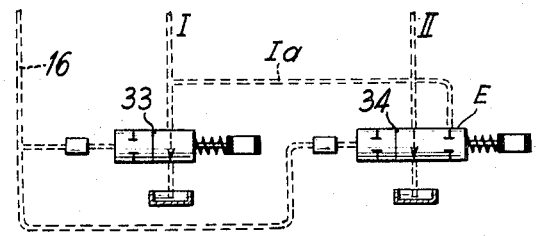
FIG. 2 shows the valve arrangement incorporated in FIG. 1 on a larger scale.

The pilot valve assemblies shown in the circuit of FIG. 1 are indicated on a larger scale in FIG. 2. In the valve position shown all the control chambers of the suction valves 17, 18 are released so that they are in operation, that is to say, they are closed on the pressure side concerned and open on the other suction side of the pressure booster. Thereby the pressure chambers are connected in parallel and the pressure booster operates at the ratio $\ddot{U}_1$.

When the pressure in the high pressure pipe 16 reaches the first changeover pressure, first the pilot valve 33 reverses and cuts off the control pipes I and 31. The pressure building up in these pipes then operates the control piston, not shown, in the suction valve 17 which is without action on the suction valve 17 already closed on the left-hand high pressure side whereas for the inspiring valve 17 on the right-hand side this results in this valve being held open on the next return movement of the low pressure piston 5. Thereby the pressure chamber 8 pertaining to this high pressure side and thereafter also the other pressure chamber of this pair is cut off from the pressure chambers. The pressure booster then operates at the ratio $\ddot{U}_2$.

When the pressure in the high pressure pipe 16 reaches the changeover value pertaining to the next ratio $\ddot{U}_3$ the pilot valve 34 arranged as a four-way valve moves to the right and cuts off the control pipes II and 32. In the way described the suction valves 18 are held open and the pair of pressure chambers 13 are cut off. In order that when selecting the ratio $\ddot{U}_3$ the pair of pressure chambers 8 is again connected, the four-way valve 34 is connected by an inlet E, which is normally cut off, through a branch pipe Ia with the control pipe I of the slide valve 33 responding to the lower reversal pressure. This branch pipe and thus the control pipes I and 31 are released in the reversed position of the valve 34 in which the control pipes II and 32 are cut off, even with the valve 33 closed, whereby the suction valves 17 again carry out their normal function, that is to say, the pair of pressure chambers 8 is again connected.

The method of operation of the pressure producing device 1 according to the invention is as follows:

When the pump 20 is connected in any starting position of the pressure controlled pilot valves 23, 24 in the low pressure circuit fluid first passes through the back pressure valve 35 direct to the high pressure pipe 16 by-passing the pressure booster 1 until the selected low pressure $P_N$ is reached in the pressure regulator 21. Then the pressure booster 1 is started through a two-way preloaded valve 37 controlled through the pipe 36 from the high pressure $P_H$, which valve is connected in parallel to the control pipe 38 of one of the pilot valves 23, 24 controlling the pressure booster, in FIG. 1 the valve 24, and on reaching the changeover pressure $P_H=P_N$ max. the valve 37 is changed over from flow to cut off and remains cut off to the end of the working operation. A pressure is now built up in the pipe 38 which opens the pilot valve 24. Thereby the right-hand piston surface of the low pressure piston 5 is operated and the piston moves to the left.

The pressure booster is caused to operate in a reciprocating manner by providing the low pressure piston 5 with projecting ring piston portions 5a, 5b which alternately enter ring chambers 2a, 2b of the low pressure cylinder 2 in each case after the piston 5 has moved across the low pressure pipe 22a, 22b respectively arranged for return movement, and produces a control pressure in the pipes 38 or 39 which reverses the pilot valves 23, 24. This mechanism is not the subject of the invention and any other reversal method can be applied within the framework of the invention. Independently of this reversal of the pressure booster 1 on the low pressure side, which operates initially with the ratio $Ü_1$, the next ratios $Ü_2$ and $Ü_3$ are selected as already described for the purpose of obtaining an approximately constant output of the pressure booster, that is the product of $P_H$ and the high pressure delivery amount $Q_H$ during the build up of pressure at the consumption point for example in the cylinder of a hydraulic press.

The variation of the pressure and volume during the pressure build up are shown in the graph of FIG. 3 for a pressure booster with $d_1=80$ mm., $d_2=50$ mm., $d_3=30$ mm. and a stroke of 40 mm. With these piston dimensions $Ü_1=1.56$; $Ü_2=2.45$; and $Ü_3=4.34$. The abscissae show the high pressure $P_H$ and the ordinates the low pressure $P_N$, the high pressure $P_H$, the output of the pump $Q_N$ as well as the delivery rate $Q_H$. The curve $a$ beginning at $P_H=80$ kg./cc. and $Q_N=100\%$ is the ideal curve of uniform output which ends at $P_H=460$ kg./cc. and $Q_H=17.4\%$ of $Q_N$ and corresponds to the condition $P_H \times Q_H=$ constant. An approximation to this ideal curve is obtained with the pressure booster device according to the invention by the stepped line $b$.

After the starting of the pump the high pressure circuit is first fed direct at $Q_H=Q_N$ whereby from 0 to $Ü_1$ a pressure of 100 kg./cc. is built up. At this pressure the first stage of the pressure booster is brought into operation with $Ü_1=1.56$ whereby $Q_H$ falls to $100/1.56=64.5\%$ of $Q_N$. For $P_N$ there is obtained now the saw-tooth-like curve $c$ which varies within the limits 64.5 to 100 kg./cc. At $Ü_2$ ($P_H=160$ kg./cc.) the second stage $Ü_2=2.45$ is brought in which corresponds to a fall of $Q_H$ to $100/2.45=41\%$ of $Q_N$. For the third changeover point $Ü_3=4.34$, $Q_H=100/4.34=23.1\%$ of $Q_N$.

As will be seen from the graph with three suitably chosen transmission ratios it is possible to approach replacing the curve $a$ of equal output by the graph $b$ to a good approximation.

Since the delivery amount of the pump $Q_N=$ constant $=100\%$ the graph $c$ represents at the same time the output N delivered by the pump. It is desirable to proportion the driving motor for the pump so that it operates at 15% overload for $P_N=100$ kg./cc. The lower limit would then lie at 75% of the normal load. Since the overload and the underload follow one another in immediate sequence no unacceptable overheating of the motor is to be feared. If however one desired to start from 460 kg./cc. for example as the maximum high pressure it is necessary to divide the pump output between two pumps for example of which one supplies 90% at $P_N$ max.$=100$ kg./cc. and the other 10% at a somewhat higher pressure of $P_N$ max.$=140$ kg./cc. By cutting off the larger pump at $P_H=460$ kg./cc. the high pressure can be increased up to $140 \times 4.34=610$ kg./cc. with a substantially reduced driving load.

What I claim is:

1. A fluid pressure booster system for association with a constant delivery pump comprising, in combination, a double acting low pressure cylinder having a piston reciprocally movable therein, low pressure conduit means for communicating said low pressure cylinder with said pump, reciprocating valve means in said low pressure conduit means for conducting low pressure fluid from said pump selectively to and from opposite sides of said piston for reciprocal movement of said piston in said low pressure cylinder, a pair of high pressure cylinders having pistons arranged on each side of and operatively associated with said low pressure cylinder for alternately pressurizing said low pressure fluid, each of said high pressure cylinders having an inlet and an outlet, one of said cylinders in each of said pairs of cylinders having a piston area greater than the piston area of the other of said cylinders to pressurize fluid at a lower pressure than the other cylinder in said pair, low pressure conduit means including inlet valves for communicating said pump with the inlet of each of said high pressure cylinders, high pressure conduit means including outlet valves connected to said outlets of each of said high pressure cylinders for delivering high pressure fluid to an associated fluid pressure operated device, control means for selectively opening said inlet valves for controlling the supply of low pressure fluid to said high pressure cylinders to thereby operate said high pressure cylinders together and individually for delivery of high pressure fluid in three progressively higher pressure stages and at a substantially constant pressure-flow rate ratio.

2. A fluid pressure booster system in accordance with claim 1 wherein said inlet valves comprise suction valves normally maintained in the closed position for alternately operating each of said pairs of said high pressure cylinders together for said first pressure stage and wherein said control means are responsive to the pressure in said high pressure conduit means for sequentially opening said inlet valves to inoperatively condition said other cylinder and said one cylinder for said second and third pressure stages.

3. A fluid pressure booster system is accordance with claim 1 wherein said low pressure piston is provided with oppositely extending portions of reduced diameter each having an outwardly opening central bore and forming said other cylinders, each of said one cylinders having a piston fixedly positioned therein and slidably receivable within the central bore of said associated low pressure piston portion, each of said fixedly positioned pistons having an axial passage communicating with said high pressure conduit means and forming an outlet for said other cylinders.

4. A fluid pressure booster system in accordance with claim 3 wherein said outlet valves comprise check valves for supplying pressurized fluid to said high pressure conduit means from both of the outlets of said high pressure cylinders simultaneously, said check valves being normally maintained in the closed position.

5. A fluid pressure booster system in accordance with claim 1 wherein said control means includes a first control conduit means including a first pilot valve responsive to a first changeover pressure in said high pressure conduit means for opening said inlet valves associated with said other high pressure cylinders when said first changeover pressure is reached for inactivating said other cylinders and a second control conduit means including a second pilot valve responsive to a second and higher changeover pressure in said high pressure conduit means for opening said inlet valves associated with said one high pressure cylinders when said second changeover pressure is reached for inactivating said one cylinders, and third conduit means including a valve controlled by said second pilot valve for by-passing said first control conduit means upon the conditioning of said second control conduit means.

6. A fluid pressure booster system in accordance with claim 5 including starting conduit means having a normally open pre-loaded valve for communicating said high pressure conduit means with said reciprocating valve means, means including a back pressure valve for communicating the outlet of said pump with said high pressure conduit means, said normally open pre-loaded valve being movable into a closed position when a predetermined pressure is reached in said low pressure conduit means to initiate the operation of said reciprocating valve means.

References Cited

UNITED STATES PATENTS

| | | | |
|---|---|---|---|
| 2,484,884 | 10/1949 | Hanna | 103—51 |
| 2,866,415 | 12/1958 | Montelius | 103—49 |
| 3,077,838 | 2/1963 | Maglott | 103—49 |

ROBERT M. WALKER, *Primary Examiner.*

U.S. Cl. X.R.

103—158